(12) United States Patent
Rao

(10) Patent No.: US 12,432,044 B2
(45) Date of Patent: Sep. 30, 2025

(54) ENCRYPTING DATA EXCHANGED BETWEEN COMPONENTS IN A LINK LAYER WITH AUTOMATIC LOCKING BETWEEN THE TRANSMITTING COMPONENT AND THE RECEIVING COMPONENT

(71) Applicant: INTERNATIONAL BUSINESS MACHINES CORPORATION, Armonk, NY (US)

(72) Inventor: Rajat Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 18/147,998

(22) Filed: Dec. 29, 2022

(65) Prior Publication Data

US 2024/0223356 A1    Jul. 4, 2024

(51) Int. Cl.
*H04L 9/06* (2006.01)
*H04L 1/00* (2006.01)

(52) U.S. Cl.
CPC .......... *H04L 9/0618* (2013.01); *H04L 1/0057* (2013.01)

(58) Field of Classification Search
CPC ... H04L 9/0618; H04L 1/0057; H04L 9/0656; H04L 9/0637
See application file for complete search history.

(56) References Cited

U.S. PATENT DOCUMENTS

| 7,477,169 B2* | 1/2009 | Carter ................... H04L 5/0092 341/59 |
| 10,263,767 B1* | 4/2019 | Doi ........................ G06F 21/755 |
| 11,533,170 B2 | 12/2022 | Elbaz et al. |
| 2017/0019174 A1* | 1/2017 | Shiraishi .......... H04B 10/07955 |
| 2019/0246148 A1 | 8/2019 | Oh et al. |
| 2021/0004495 A1 | 1/2021 | Osugi |
| 2021/0344653 A1 | 11/2021 | Harriman et al. |
| 2021/0391978 A1 | 12/2021 | Clinton et al. |

(Continued)

FOREIGN PATENT DOCUMENTS

| KR | 20220028890 A | 3/2022 |
| WO | 2024/141268 A1 | 7/2024 |

OTHER PUBLICATIONS

International Search Report and Written Opinion, PCT/EP2023/085631, mailed Mar. 27, 2024, 12 pages.

(Continued)

*Primary Examiner* — Sm A Rahman
(74) *Attorney, Agent, or Firm* — Onyx IP Group

(57) ABSTRACT

A method for encrypting frames transmitted from a transmitter to a receiver includes transmitting unencrypted training frames of a set from the transmitter to the receiver, with each training frame scrambled prior to transmission on an output of a counter of the transmitter and a training frame, where each scrambled training frame is unencrypted. A control signal from the transmitter is transmitted from the transmitter to the receiver after the training frames. After transmitting the control signal to the receiver, a frame modified to include error detection information is encrypted using an encrypted counter block that is generated from the output of the counter. The encrypted modified frame is transmitted from the transmitter to the receiver.

18 Claims, 5 Drawing Sheets

(56) References Cited

U.S. PATENT DOCUMENTS

2022/0278826 A1   9/2022   Jabbour et al.

OTHER PUBLICATIONS

R. Housely, Using Advanced Encryption Standard (AES) Counter Mode With IPsec Encapsulating Security Payload (ESP) (RFC3686), An IP.com Prior Art Database Technical Disclosure, IP.com No. IPCOM000021656D, Original Publication Date: Jan. 1, 2004, IP.com Electronic Publication Date: Feb. 15, 2019, 20 pages.

* cited by examiner

ENCRYPTING DATA EXCHANGED BETWEEN COMPONENTS IN A LINK LAYER WITH AUTOMATIC LOCKING BETWEEN THE TRANSMITTING COMPONENT AND THE RECEIVING COMPONENT

BACKGROUND

Field of the Invention

The field of the invention is data processing, or, more specifically, methods, apparatus, and products for encrypting data exchanged between processing cores.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many computing system configurations include one or more servers. A server includes multiple nodes that are connected to each other through links. For example, certain nodes of a server are processing cores, other nodes are storage, while other nodes provide other functionality. Different nodes are often in different physical locations and connected to each other. For example, a node is connected to another node through a network cable or other wired connector. Other types of connections between nodes may be implemented in different configurations.

However, connections between nodes of a server are relatively accessible for third parties to probe or to infiltrate a computing system. For example, network cables between nodes are relatively accessible to third parties and provide an entry point for a third party to obtain data from the computing system. Data communicated through a connection often includes sensitive information, such as customer or user information, making the connections between nodes potential vulnerabilities for a computing system.

To protect data communicated through connections between nodes, data exchanged through a connection is encrypted in various configurations. However, conventional methods for encrypting data increases a latency of data transmission through a connection by introducing additional time for performing the encryption. Further, conventional encryption methods involve retraining counters used when scrambling data for transmission through a link each time the link is reestablished or retrained and lack authentication mechanisms for the exchanged data.

SUMMARY

Methods and systems for encrypting frames transmitted from a transmitter to a receiver includes transmitting unencrypted training frames of a set from the transmitter to the receiver, with each training frame scrambled prior to transmission on an output of a counter of the transmitter and a training frame, where each scrambled training frame is unencrypted. A control signal from the transmitter is transmitted from the transmitter to the receiver after the training frames. After transmitting the control signal to the receiver, a frame modified to include error detection information is encrypted using an encrypted counter block that is generated from the output of the counter. The encrypted modified frame is transmitted from the transmitter to the receiver.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

Figure (FIG. 1 is a block diagram of an example computing environment, according to some embodiments of the present disclosure.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
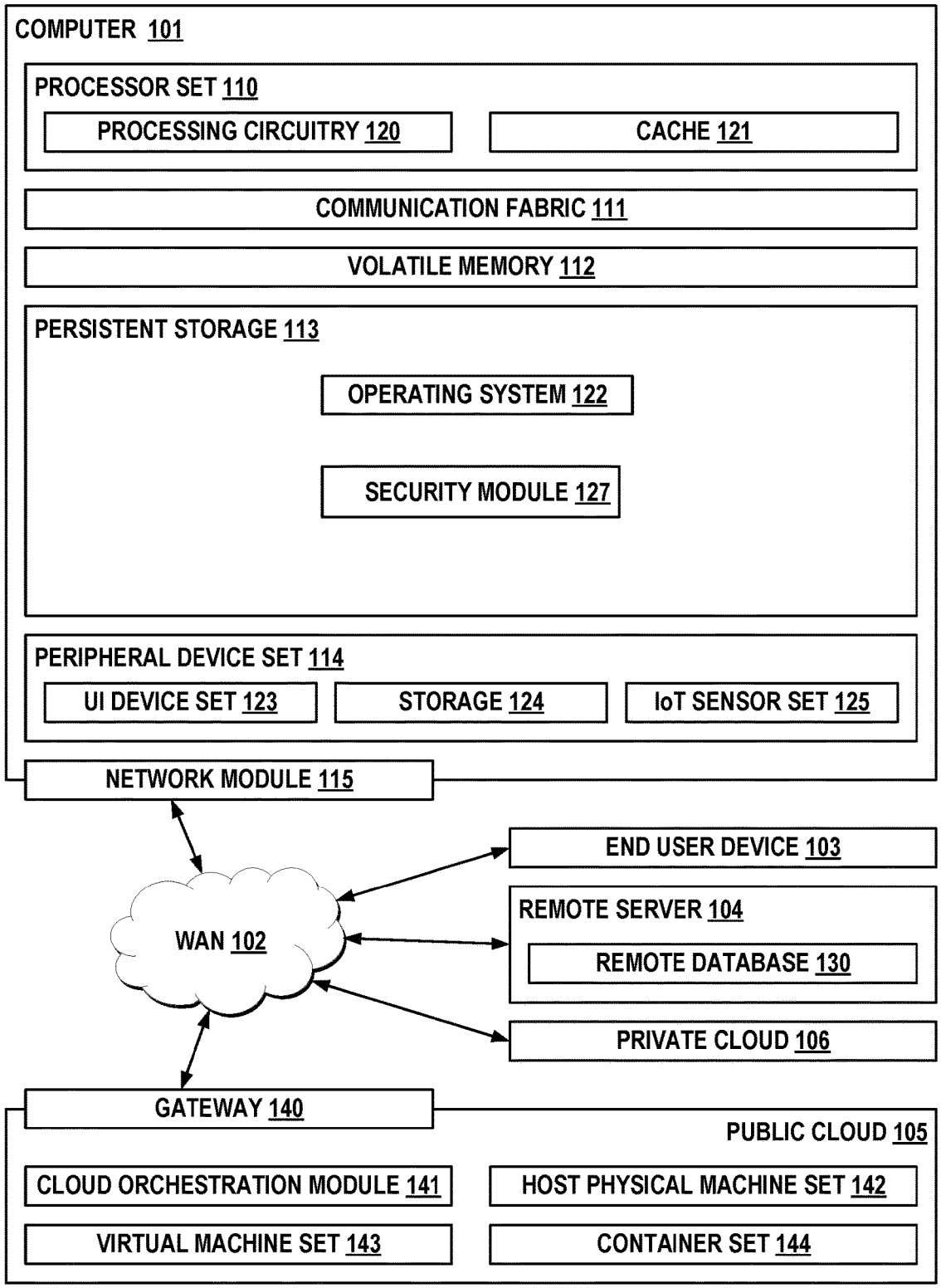

Computing environment 100 shown in FIG. 1 contains an example of an environment for the execution of at least some of the computer code involved in performing the inventive methods, such as security implementation module 127. In addition to security implementation module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and security implementation module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Computing environment 100 contains an example of an environment for the execution of at least some of the computer code involved in performing the inventive methods, such as the security implementation module 127. The security implementation module 127 includes instructions and data for encrypting data transmitted to another device or component and for decrypting data received from another device or component. The security implementation module 127 also includes instructions for synchronizing a counter used for encryption and decryption of data by the computer 101 and another device (e.g., another computer 101, a processor). In addition to security implementation module 127, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and testing module 127, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the security implementation module 127 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the security implementation module 127 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
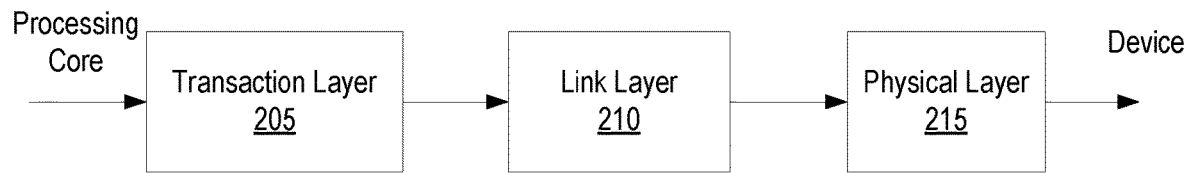
FIG. 2 is a block diagram of an example interconnect architecture, according to some embodiments of the present disclosure.

For further illustration, FIG. 2 shows an example of a layered protocol stack used by one or more computers, such as computer 101, to send and to receive data. Examples of the layered protocol stack include a Peripheral Component Interconnect Express (PCIe) stack, a Quick Path Interconnect (QPI) stack, or other type of layered protocol stack. In the example shown by FIG. 2, the layered protocol stack includes a transaction layer 205, a link layer 210, and a physical layer 215. In other embodiments, additional layers may be included in the layered protocol stack. An interface for the computer 101, or for a processing core of a computer 101 (e.g., a processor of processor set 110) to exchange data with another device (e.g., another computer 101, another processing core) may be represented as a layered protocol stack, such as shown by FIG. 2.

Data packets carrying information from a transmitting device to a receiving device are formed by the transaction layer 205 and by the link layer 210. Different layers add different information to a data packet. After formation in the transaction layer 205 and in the link layer 210, a data packet is transmitted from a transmitting device to a receiving device using the physical layer 215. A receiving device receives a data packet from the physical layer 215, with layers after the physical layer 215 modifying the data packet based on information in the data packet until the data packet reaches the transaction layer 205. The transaction layer 205 of the receiving device then processes the data packet.

The transaction layer 205 provides an interface between a device's processing core (e.g., processor set 110 of computer 101) and an interconnection architecture including the link layer 210 and the transaction layer 215. The transaction layer 215 assembles packets for transmitting data and disassembles packets of received data. For example, the transaction layer 215 assembles a packet header and a packet payload for data. In some embodiments, the transaction layer 215 assembles packets based on a specification that describes content and structure of packets. An example specification for assembling a packet is the PCIe specification.

The link layer 210 is between the transaction layer 205 and the physical layer 215. The link layer 210 provides a mechanism for exchanging packets between different components over a link. In various embodiments, the mechanism provided by the link layer 210 has at least a threshold reliability. As further described below in conjunction with FIG. 3, a portion of the link layer receives data packets from the transaction layer 205, applies information to the packets identifying a sequence of the packets, generates and includes error correction information in a packet, and transmits the packets including the sequence information and error correction information to the physical layer 215.

The physical layer 215 transmits packets from the link layer 210 across a physical medium to another component or device. The physical layer 215 prepares outgoing packets for transmission and identifies and prepares incoming packets before routing the incoming packets to the link layer 210. Hence, the physical layer 215 provides a transmitter and a receiver. The transmitter of the physical layer 215 serializes data packets from the link layer 210 and transmits the serialized packets to another device or a component. For example, the physical layer 215 transmits serialized packets from a processing core to another processing core through a network cable or another type of physical connection. Additionally, the physical layer 215 includes a receiver that receives packets from a physical connection (e.g., from another device or component through the physical connections), with the packets subsequently de-serialized and allocated into frames that are provided to the link layer 210

Thus, in various embodiments, the layered protocol stack described in conjunction with FIG. 2 includes a layer that assembles packets from data received from a processor core, the transaction layer 205. Another layer, the link layer 210, sequences the assembled packets. An additional layer, the physical layer 215, transmits the sequence of assembled packets to another processor core or other device using a physical connection. As further described below in conjunction with FIGS. 3-7, encrypting data in in the link layer 210 allows data to be secured when being transmitted through the physical layer 215.

The security implementation module 127 includes a transmitter and a receiver. With the transmitter allowing the security implementation module 127 to transmit data from a processor core, such as a processor from processor set 110, and the receiver allowing the security implementation module 127 to receive data from a device or component. As further described below in conjunction with FIG. 3, the transmitter encrypts data from the transaction layer 205 to prevent unauthorized access from the data when the data is transmitted via a physical connection. As further described below in conjunction with FIG. 4, the receiver decrypts data from the physical layer 215 and routes the decrypted data to the transport layer 205.

Figure 3:
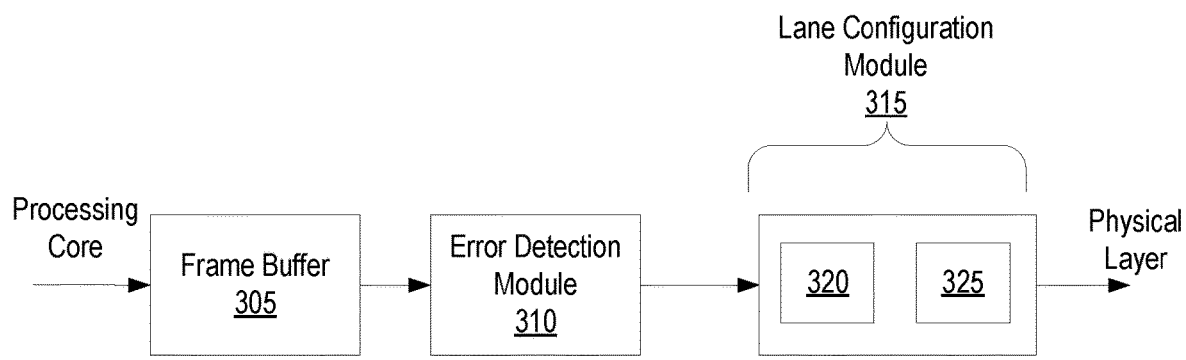
FIG. 3 is a block diagram of a transmitter of a security implementation module, according to some embodiments of the present disclosure.

Referring to FIG. 3, a block diagram of an example transmitter of the security implementation module 127 is shown. The transmitter shown in FIG. 3 includes a frame buffer 305, an error detection module 310, and one or more lane transmission modules 315. A lane configuration module 315 includes a scrambler 320 and a synchronization module 325. In other embodiments, the transmitter includes different or additional modules than those described in conjunction with FIG. 3.

For purposes of illustration, the transmitter shown in FIG. 3 receives data from a processing core, such as a processor. However, in other embodiments, the transmitter receives data from another component. Data received by the transmitter is received by a frame buffer 305 that generates a queue of packets received by the transmitter. This allows the transmitter to form a frame including data packets received from the transmitter. In different embodiments, the frame buffer 305 includes different numbers of data packets in a frame.

The output of the frame buffer 305, which is a frame (e.g., a group) of packets, is received by an error detection module 310. The error detection module 310 generates error detection information for a frame that is included in the frame. The error detection information is included in the frame along with data from the packets to allow detection of changes in data included in the frame during transmission. In various embodiments, the error detection information is a cyclic redundancy check (CRC) code, with the error detection module 310 appending the CRC code to the frame. In other embodiments, the error detection module 310 generates other types of error detection information allowing a receiving device to identify errors in a frame and appends the error detection information to the frame.

The frame including the error detection information is received as input by a lane transmission module 315. In various embodiments, frames are transmitted through a physical layer having multiple lanes, with each lane capable of transmitting data. For example, lanes correspond to different pairs of wires in a network cable or to different wires in a network cable. In other examples, a lane is a set of signal traces, wires, or other conductive pathways coupling the transmitter to a physical connection (e.g., a network cable). Different numbers of lanes may be used to transmit frames, with an increased number of lanes transmitting an increased number of frames, providing higher data transfer rates. In some embodiments, the transmitter includes a lane configuration module 315 for each lane.

The lane configuration module 315 includes a scrambler a scrambler 320 and a synchronization module 325. The scrambler 320 receives the frame including the error detection information from the error detection module 310. The scrambler 320 modifies a frame prior to transmission to simplify recovery of timing information and data from the frame by a receiving device. In various embodiments, the scrambler increases a number of transitions from logical high values to logical low values or transitions form logical low values to logical high values in a frame. The increased number of transitions between values allows a receiver to better recover data and clock information from a frame. For example, the scrambler 320 is an additive scrambler where a linear feedback shift register generates a pseudorandom binary sequence that is a seed value. The scrambler performs a serial XOR operation with the seed value output from the linear feedback shift register and the frame including the error detection information.

In contrast to conventional scramblers, the scrambler 320 of FIG. 3 encrypts data. In various embodiments, the scrambler 320 encrypts data using the advanced encryption standard (AES). In other embodiments, other block cipher encryption methods or other encryption methods are used to encrypt data. In various embodiments, the scrambler uses block cipher encryption in a counter mode, where a counter generates a keystream that is combined with unencrypted data from a frame to encrypt the frame. For example, the counter is a linear feedback shift register. In various embodiments, the counter is combined with a starting value using an invertible operation (e.g., XOR, concatenation, addition) to produce a unique counter block. The counter block is encrypted with a key using AES or another block cipher encryption method, with the encrypted counter block used to encrypt a frame. For example, the encrypted counter block is combined with a frame using an XOR operation to generate an encrypted frame.

Figure 4:
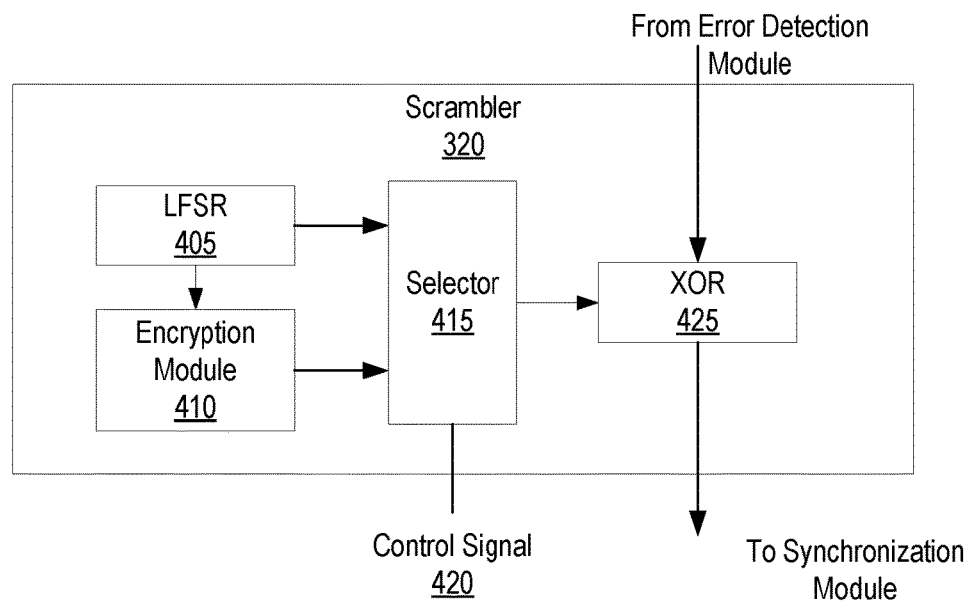
FIG. 4 is a block diagram of a scrambler of a transmitter that includes encryption, according to some embodiments of the present disclosure

Referring to FIG. 4, a block diagram of one embodiment of a scrambler 320 is shown. In the example of FIG. 4, the scrambler 320 includes a linear feedback shift register (LFSR) 405, an encryption module 410, a selector 415, and an XOR module 425. However, in other embodiments, the scrambler includes different or additional components than those described in conjunction with FIG. 4.

The scrambler 320 encrypts data, such as frames, using block cipher encryption in various embodiments. For example, the scrambler 320 encrypts data using the advanced encryption standard (AES). In other embodiments, other block cipher encryption methods or other encryption methods are used to encrypt data. The scrambler 320 shown in FIG. 4 encrypts data using block cipher encryption in a counter mode, where a counter generates a keystream that is combined with unencrypted data from a frame to encrypt the frame. The example of FIG. 4 includes the LFSR 405 as the counter. The LFSR 405 of the scrambler 320 is free-running, so the LFSR 405 is continually incremented, providing a new value used for encryption, with the number of possible values based on a bit-width of the LFSR 405. In other embodiments, other types of counters may be used, with the counters continuously incremented.

The output of the LFSR 405 (or other counter) is received by the encryption module 410. which combines the output of the LFSR 405 with a starting value using an invertible operation (e.g., XOR, concatenation, addition) to produce a unique counter block. The encryption module 410 encrypts the counter block with a key using AES or another block cipher encryption method. The encrypted counter block is output from the encryption module 410 and used to encrypt a frame, as further described below.

The LFSR 405 and the encryption module 410 are coupled to the selector 415. Based on a control signal 420, the selector 415 selects an output of the LFSR 405 or the encryption module 410 that is received as an input to the XOR module 425. In response to the control signal 420 having a first value, the selector 415 couples the output of the LFSR 405 to the XOR module 425, while in response to the control signal 420 having a second value, the selector 415 couples the output of the encryption module 410 to the XOR module 425. In various embodiments, the control signal 420 has the first value when the scrambler 320 operates in a training mode where frame data is transmitted without being encrypted (i.e., transmitted in plaintext). In the training mode, the scrambler 320 does not encrypt frames, and the frames transmitted during the training mode are from a set of training frames. Instead, during the training mode, the output of the LFSR 405 is combined with a frame using the XOR module 425, which performs an exclusive OR operation to bits of the LFSR 405 output and bits of the frame, to increase a number of transitions between logical high and logical low values in a frame prior to transmission, simplifying recovery of timing information and data from the frame by a receiving device. The set of training frames are transmitted in a specific sequence determined by an order of the training frames in the set, in various embodiments, this allows a receiving device to maintain expected values for different frames. As further described below, transmitting training frames for which a receiving device has an expected value allows a counter (e.g., a LFSR) of the receiving device to synchronize, or lock, with the LFSR 405 during the training mode. This allows the training mode to simplify synchronization of the LFSR 405 and a counter of a receiving device.

When a counter is used to encrypt a frame without synchronizing a counter of the transmitter and a counter of the receiver, the receiver is unable to accurately decrypt an encrypted frame. Such synchronization of a transmitter's counter and a receiver's counter is referred to as "locking" the transmitter's counter and the receiver's counter. In conventional implementations, the transmitter's counter and the receiver's counter are renegotiated or refreshed when the link between the transmitter and the receiver is retrained, introducing additional complexity and computational resources. The training mode described above allows training frames to be transmitted in plaintext, while being scrambled using the output of the LFSR 405, allowing a receiver to determine the values of the receiver's counter that is synchronized with the LFSR 405 of the scrambler based on a received training frame and an expected value of frame.

In response to the control signal 420 having the second value, the selector 415 couples the output of the encryption module 410 to the XOR module 425, which combines the output of the encryption module 410 with a frame using an exclusive OR operation to bits of the frame and bits of the output of the encryption module 410. This combines the encrypted counter block output by the encryption module 410 with a frame using the XOR module 425, generating an encrypted frame. The encrypted frame is subsequently output from the scrambler 320 and transmitted to a receiving device or component via a physical layer 215, as further described above in conjunction with FIG. 2.

Using the output of the LFSR 405 (or of another counter) as input to the encryption module 410 allows a frame to be encrypted prior to transmission, while simplifying retraining of a link between the transmitter and a receiver through a training mode that modifies a frame using the output of the LFSR 405 rather than using the output of the encryption module 410. Additionally, using a continuously incremented (or "free-running") LFSR 405 prevents the encryption module 410 from receiving a repeated input. Additionally, having the LFSR 405 input as input to the encryption module 410 allows encryption of frame data without introducing additional delay for the encryption.

Referring back to FIG. 3, a frame output by the scrambler 320 is input to the synchronization module 325. The synchronization module 325 appends a synchronization header to a frame. Additionally, in various embodiments, the synchronization module 325 encodes information identifying boundaries between packets in a frame to simplify identification of packets that comprise a frame. When the scrambler 320 operates in the training mode, the synchronization module 325 receives an unencrypted frame including error detection information from the scrambler 320. However, when the scrambler 320 is not operating in the training mode, the synchronization module 325 receives an encrypted frame including error detection information. The output of the synchronization module 325 is transmitted via the physical layer 215 to a receiving device, such as a processor core.

Figure 5:
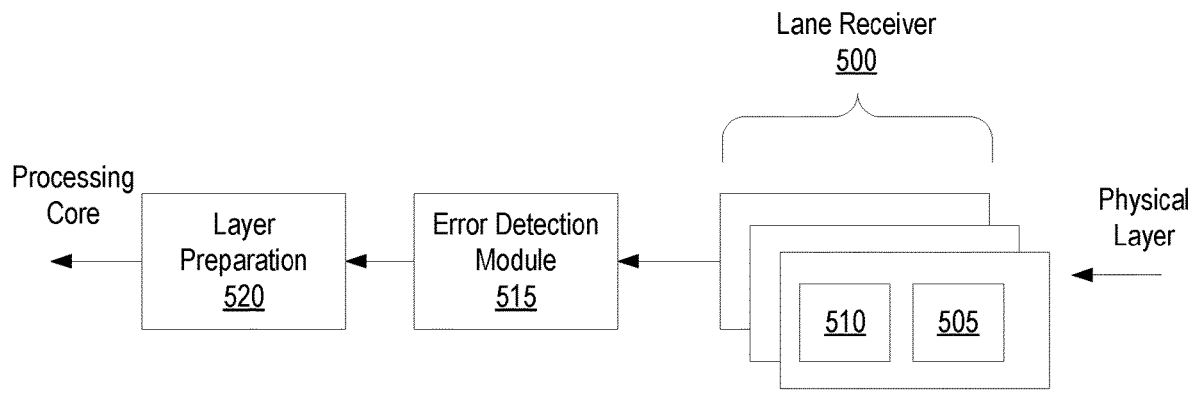
FIG. 5 is a block diagram of a receiver of a security implementation module, according to some embodiments of the present disclosure.

While FIGS. 3 and 4 describe a transmitter of the security implementation module 127 for transmitting data from the security implementation module 127, the security implementation module 127 also includes a receiver that receives data from another device. FIG. 5 is a block diagram of a receiver of the security implementation module 127. In the example shown by FIG. 5, the receiver includes a set of lane receivers 500, an error detection module 515, and a layer preparation module 505. However, in other embodiments, the receiver includes different or additional modules than those shown in FIG. 5.

In various embodiments, the receiver includes a lane receiver 500 for each lane comprising the physical layer. This allows the receiver to receive multiple frames of data in parallel from different lanes. One or more lanes may not include frames. A lane receiver 500 includes a synchronization module 505 and a descrambler 510 in the example shown by FIG. 5. In other embodiments, the lane receiver includes additional or different components than those shown in FIG. 5. The descrambler 510 receives frames of data from the physical layer.

The synchronization module 505 aligns frames received from the transmitter. In various embodiments, the synchronization module 505 of the transmitter extracts a synchronization header appended to a frame by the synchronization module 325 of the transmitter. The synchronization module 505 of the transmitter uses information from the synchronization header to identify boundaries between packets and identify packets comprising the frame.

Additionally, the synchronization module 505 offsets propagation delays in receiving frames. The propagation delays may be introduced from different path lengths of different lanes of a communication channel from which the receiver receives frames or from control signals added by the receiver to received frames. These delays introduce skew into the received frames, and the synchronization module 505 includes one or more deskew methods that are applied to received frames. The one or more deskew methods align the received frames to offset propagation delays from receipt of the frames. Different deskew methods may be used in different embodiments, with the one or more deskew methods applied to a frame before the frame is communicated to a descrambler 510.

Figure 6:
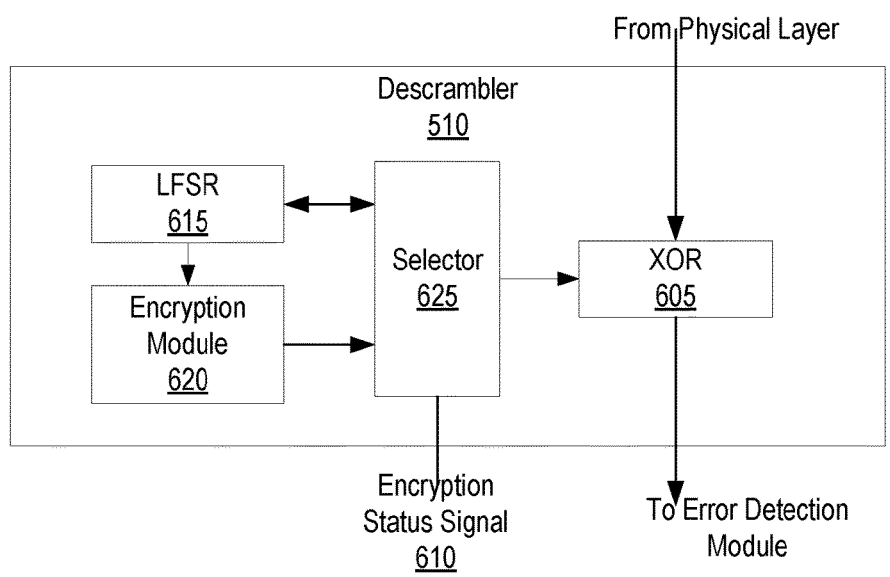
FIG. 6 is a block diagram of a descrambler including decryption of a transmitter, according to some embodiments of the present disclosure.

Referring to FIG. 6, a block diagram of one embodiment of a descrambler 510 is shown. In the example of FIG. 6, the descrambler 510 includes an XOR module 605, a linear feedback shift register (LFSR) 615, an encryption module 620, and a selector 625. In other embodiments, the descrambler 510 includes different or additional components than those described in conjunction with FIG. 5.

The XOR module 605 receives a frame from the physical layer and an output of the selector 625. The XOR module 605 performs an exclusive OR operation on bits of the received frame and bits of the output of the selector 625. An output of the XOR module 605 is the output of the descrambler 510 and is routed to the error detection module 515 through the synchronization module 520.

The selector 625 selects an output of the LFSR 615 or an output of the encryption module 620 based on an encryption status signal 610. The encryption status signal 610 is received by the receiver from the transmitter. A first value of the encryption status signal 610 indicates the receiver is receiving unencrypted, or plaintext, frames, while a second value of the encryption status signal 610 indicates the receiver is receiving encrypted frames. When the encryption status signal and has a first value to indicate the transmitter is transmitting encrypted data. In various embodiments, the first value, indicating receipt of unencrypted frames, is a default for the encryption status signal 610, and the encryption status signal 610 changes to the second value, indicating receipt of encrypted data, in response to receiving a control packet from the transmitter. In some embodiments, the transmitter transits the control packet on all lanes between the transmitter and the receiver, and the receiver determines the control packet was received in response to at least a threshold number of the lanes receiving the control packet. For example, the receiver sets the encryption status signal 610 to the second value, indicating receipt of encrypted data, in response to a majority of the lanes receiving the control packet. When the encryption status signal 610 has the second value, the descrambler 510 determines that received frames are encrypted and couples the output of the encryption module 620 to the XOR module 605.

When the encryption status signal 610 has the first value, which indicates frames are not encrypted, the descrambler 510 operates in a training mode where unencrypted frames are received. As further described above in conjunction with FIG. 5, frame data is transmitted without being encrypted in the training mode, so the descrambler 510 receives unencrypted training frames from a set of training frames. The transmitter and the receiver have the set of training frames stored and an order in which the training frames are transmitted, allowing the receiver to maintain an expected value for each training frame of the set. During the training mode, the descrambler performs an exclusive OR operation on bits of a received initial training frame and bits of an expected value of the initial training frame. The result of the exclusive OR operation of the received initial training frame and the expected value of the initial training frame is provided to the LFSR 615 (or other counter) to provide an initial value for the LFSR 615. The LFSR continuously increments from the initial value. For subsequently received training frames while in the training mode, the descrambler 510 provides the output of the LFSR 615 to the XOR module 605, which performs an exclusive OR operation on the output of the LFSR 615 and a received training frame. The descrambler 510 compares the output of the exclusive OR module 605, which is the descrambled received training frame to an expected value for the received training frame. In response to a threshold number of training frames received after the initial training frames matching corresponding expected values for the training frames after being descrambled, the descrambler 510 determines the LFSR 615 is locked with the LFSR 405 of the scrambler 320. With the LFSR 615 of the descrambler 510 locked with the LFSR 405 of the scrambler 320, the descrambler 510 is capable of decrypting subsequently received frames from the physical layer. When the training mode ends, the scrambler 320 transmits the control packet to the descrambler 510 using multiple lanes, with receipt of the control packet setting the encryption status signal 610 to a value indicating that encrypted frames are being received (e.g., the second value in the example above).

The LFSR 615 is also coupled to an encryption module 620, with the encryption module 620 also coupled to the selector 625. The encryption module 620 combines the output of the LFSR 615 with a starting value using an invertible operation (e.g., XOR, concatenation, addition) to produce a unique counter block. The encryption module 620 encrypts the counter block with a key using AES or another block cipher encryption method. The encrypted counter block is output from the encryption module 620 and used to decrypt a received frame. To decrypt a received frame, the selector 625 couples the output of the encryption module 620, which is the encrypted counter block, to the XOR module 605, which performs an exclusive OR operation on a received frame and the encrypted counter block. When the received frame is encrypted, the exclusive OR operation with the encrypted counter block decrypts the received frame. As further described above in conjunction with FIGS. 3 and 4, the received frame includes error detection information, so decrypting a received frame results in decrypted data from the frame and error detection information from the frame. The decrypted frame including error correction information is output from the XOR module 605 to the error detection module 515.

Referring back to FIG. 5, the error detection module 515 receives a decrypted frame from the descrambler, with the decrypted frame including error detection information. The error detection module 515 applies one or more error detection methods to error detection information to determine whether the decrypted frame includes errors. For example, the error detection module 515 generates a check value from the decrypted frame and compares the check value to error detection information included in the frame, if the check value differs from the error detection information included in the frame, the error detection module 515 determines the frame includes one or more errors from transmission. In contrast, if the check value matches the error detection information included in the frame, the error detection module 515 determines the frame was received without errors from transmission. In other embodiments, the error detection module 515 determines whether a remainder from dividing the frame including the error detection information by a divisor used by the error detection module 310 of the transmitter is zero. If the remainder is zero, the error detection module 515 determines the frame does not include an error, while the error detection module 515 determines the frame includes an error if the remainder is non-zero. The error detection module 515 performs one or more error correction processes on a frame in which an error is detected in some embodiments, or the error detection module 515 initiates a request for retransmission of a frame including an error to the transmitter in other embodiments.

Frames determined not to include errors are transmitted from the error detection module 515 to a layer preparation module 520. The layer preparation module 520 checks integrity of packets included in a frame from the layer preparation module 520 and transmits the packets and descriptions of the packets to the transaction layer 205 for routing to a processing core or another receiving device.

Figure 7:
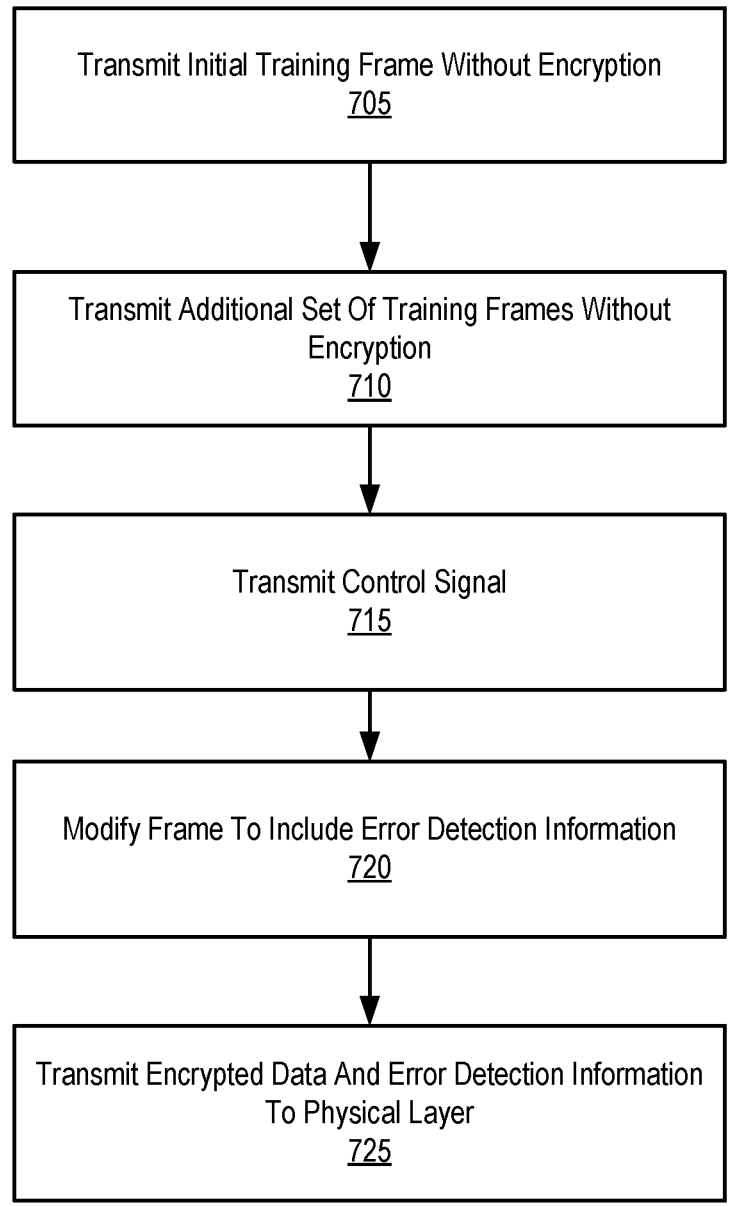
FIG. 7 is flowchart of a method for transmitting an encrypted frame using a counter used by a transmitter, according to some embodiments of the present disclosure.

For further illustration, FIG. 7 depicts a flowchart of an example method for transmitting an encrypted frame using a counter used by a transmitter. The method shown in FIG. 7 includes a training mode that synchronizes a counter of the transmitter and a counter of the receiver. In contrast to conventional methods where the counter of the receiver and the counter of the receiver are refreshed to a common value for synchronization when a link between transmitter and receiver is refreshed, the method of FIG. 7 allows automatic synchronization of the counter of the receiver and the counter of the transmitter when the link is retrained. Additionally, the method of FIG. 7 encrypts data after error detection information is added to the data, providing increased security from active attacks that modify data transmitted between the transmitter and the receiver, as such modification introduces errors introduced to the data by the modification.

A transmitter, such as the transmitter described in conjunction with FIG. 3, transmits 705 an initial training frame to a receiver while in a training mode. The initial training frame is unencrypted and is included in a set of training frames, with training frames having values known to the transmitter and to the receiver. Training frames are also transmitted in an order specified by the set, allowing the receiver to determine expected values for training frames. The transmitter scrambles the initial training frame prior to transmission, as further described above in conjunction with FIGS. 3 and 4. For example, the transmitter combines the training frame with an output of a counter, such as a linear feedback shift register (LFSR), to increase a number of transitions between values of the initial training frame. The counter is free running, so the counter is continuously incremented. For example, the transmitter performs an exclusive OR operation on the initial training frame and the output of the counter, with the result of the exclusive OR operation transmitted 705 from the transmitter to the receiver.

As further described below in conjunction with FIG. 8, the receiver uses the initial training frame to determine an initial value for a counter of the receiver. Subsequently, the transmitter transmits 710 additional training frames from the set after scrambling each of the additional training frames. While the additional training frames of the set are not encrypted, each of the additional training frames is scrambled based on an output of the counter of the transmitter. As the counter of the transmitter is continuously incremented, different additional training frames transmitted 710 at different times are scrambled using different values of the counter of the transmitter. In various embodiments, the initial training frame and the additional training frames each include error detection information that was added to the initial training frame and to the one or more additional training frames before scrambling the training frames.

After transmitting the set of training frames, or after transmitting at least a threshold amount of the set of training frames, the transmitter transmits 715 a control signal to the receiver. The control signal identifies a point in time when the transmitter begins transmitting encrypted frames to the receiver. As further described below in conjunction with FIG. 8, in response to receiving the control signal, the receiver configures itself to decrypt frames received after the control signal was received. In various embodiments, the transmitter transmits 715 the control signal across multiple lanes that form a communication link between the transmitter and the receiver. Transmitting 715 the control signal across multiple lanes provides redundancy against bit errors for the control signal occurring during transmission, increasing a likelihood of the receiver receiving the control signal.

The transmitter modifies 720 frames to include error detection information. For example, the transmitter appends error detection information to data included in a frame. In various embodiments, the error detection information comprises cyclic redundancy check codes that are appended to a frame, creating a modified frame including data comprising the frame and the error detection information.

After transmission of the control signal, the transmitter encrypts a modified frame that includes the error detection information using an output of the counter, such as the LFSR output. As further described above in conjunction with FIGS. 3 and 4, the transmitter combines an output of the counter with a starting value using an invertible operation (e.g., XOR, concatenation, addition) to produce a unique counter block. The counter block is encrypted with a key using AES or another block cipher encryption method, with the encrypted counter block combined with a modified frame to generate a modified encrypted frame. For example, after transmitting 715 the control signal to the receiver, the transmitter decouples an output of the counter from an exclusive OR operation and couples an output of an encryption block, such as encryption module 410 in FIG. 4, to the exclusive OR operation. Such a configuration performs the exclusive OR operation on a modified frame including error detection information and an encrypted counter block that the encryption module generated from the output of the counter of the transmitter to encrypt the modified frame that includes error detection information. As the modified frame includes error detection information, the transmitter encrypts both the data comprising the frame and the error detection information by encrypting the modified frame. The transmitter transmits 725 the encrypted modified frame to the receiver. By encrypting the error detection information along with the data comprising the frame, the transmitter provides additional protection against modification of data transmitted through the communication link (e.g., through a network cable or other connection) during transmission and transmission of the modified data, as the modified data would cause the receiver to detect an error based on the error detection information.

Figure 8:
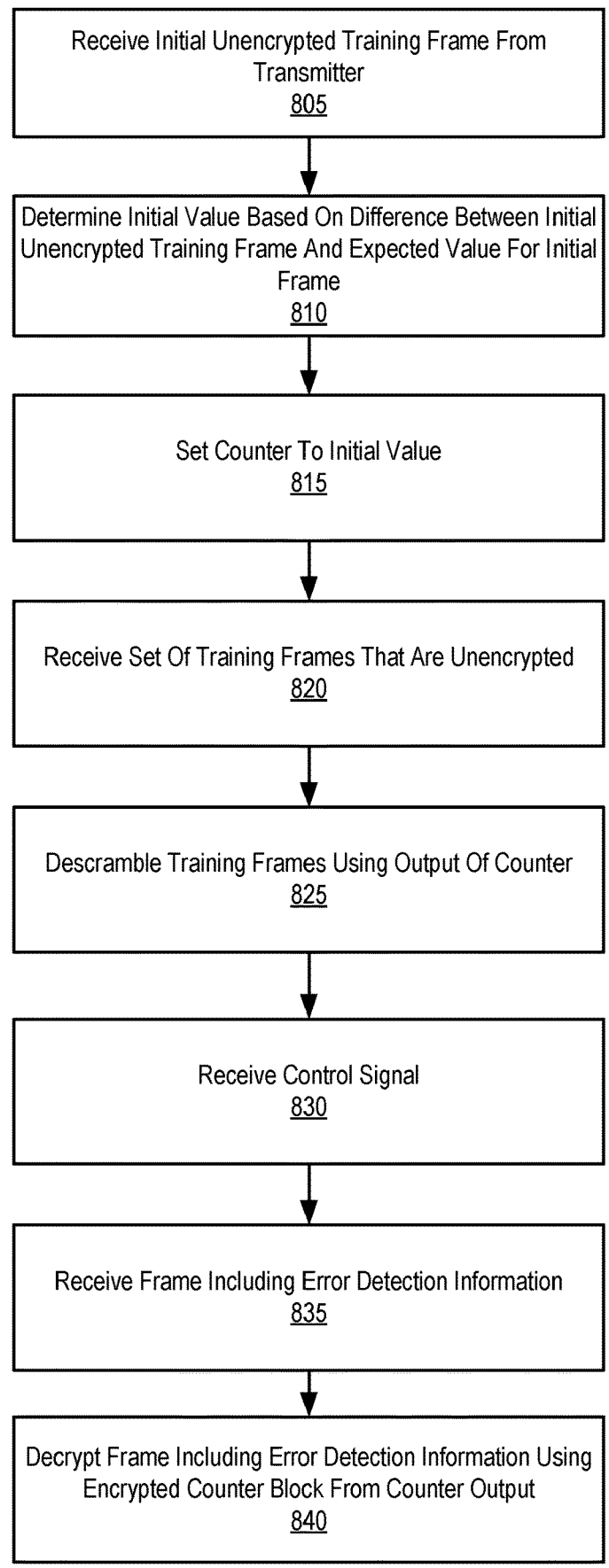
FIG. 8 is flowchart of a method for decrypting a received frame after locking a counter in a receiver to a counter in a transmitter, according to some embodiments of the present disclosure.

FIG. 8 is flowchart of one embodiment of a method for decrypting a received frame after locking a counter in a receiver to a counter in a transmitter. Like the method described in conjunction with FIG. 7, the method described in conjunction with FIG. 8 includes a training mode that synchronizes a counter of the receiver with and a counter of the transmitter. In contrast to conventional methods where the counter of the receiver and the counter of the receiver are refreshed to a common value for synchronization when a link between transmitter and receiver is refreshed, the method of FIG. 8 allows automatic synchronization of the counter of the receiver and the counter of the transmitter when the link is retrained.

During a training mode, the receiver receives 805 an initial training frame. The initial training frame is unencrypted and is included in a set of training frames, with training frames having values known to the transmitter and to the receiver. Training frames are also transmitted in an order specified by the set, allowing the receiver to determine expected values for training frames. In various embodiments, the initial training frame was scrambled by the transmitter prior to transmission based on an output of a counter, such as a linear feedback shift register (LFSR) of the transmitter. The receiver uses the initial training frame and an expected value for the initial training frame to determine 810 the output of the counter of the transmitter used to scramble the initial training frame, which is used as an initial value of a counter of the receiver, such as a LFSR of the receiver.

To determine 810 the initial value of the counter of the receiver from the initial training frame, the receiver determines a difference between the initial training frame and an expected value for the initial training frame. For example, the receiver determines the difference between the initial training frame and the expected value for the initial training frame by performing an exclusive OR on the initial training frame and the expected value of the initial training frame, with the output of the exclusive OR identifying the difference between the initial training frame and the expected value for the initial training frame that is an initial value for the counter of the receiver. In other embodiments, the receiver performs a different operation to determine the difference between the difference between the initial training frame and the expected value for the initial training frame for use as the initial value of the counter of the receiver. The receiver sets 815 the counter of the receiver to the determined initial value, allowing the receiver to infer a value of the counter of the transmitter when transmitting the initial training frame and to set the counter of the receiver to an initial value matching the inferred value of the counter of the transmitter.

With the counter set 815 to the initial value determined 810 from the difference between the initial training frame and the expected value for the initial training frame, the counter of the receiver is continuously incremented (i.e., the counter is free running). While the counter is incremented, the receiver receives 820 training frames from a set of training frames. Each training frame of the set is unencrypted but is scrambled by the transmitter prior to transmission. Using a value from the counter, based on incrementing the counter from the initial value, the receiver descrambles 825 a training frame and determines whether the training frame matches an expected value for the training frame. For example, the receiver descrambles 825 a training frame by performing an exclusive OR on the output of the counter of the receiver when the training frame was received and the training frame, with the result being a descrambled training frame. As further described above, the receiver determines the expected value for the training frame based on a position within the set of the training frame. In response to determining a threshold number of training frames received from the transmitter match a corresponding expected value for the training frames after descrambling 825 by the receiver, the receiver determines the counter of the receiver is locked, or is synchronized, with the counter of the transmitter. For example, in response to a threshold number of consecutive training frames matching corresponding expected values of the training frames after descrambling 825 by the receiver, the receiver determines the counter of the receiver and the counter of the transmitter are synchronized. In various embodiments, the above-described synchronization of the counter of the transmitter and the counter of the transmitter is performed for each of a plurality of lanes of a communication link between the transmitter and the receiver, allowing synchronization of the counter of the transmitter and the counter of the receiver for individual lanes.

The receiver subsequently receives 830 a control signal from the transmitter indicating the training mode has ended. In response to receiving 830 the control signal, the receiver modifies one or more configuration setting to decrypt subsequently received frames. For example, in response to receiving 830 the control signal, the receiver decouples the output of the counter of the receiver form an exclusive OR operation and couples an output of an encryption module, such as the encryption module 620 in FIG. 6, to the exclusive OR operation. This causes the receiver to determine an exclusive OR between the output of the encryption module, which is an encrypted counter block, as further described above in conjunction with FIG. 6, and frames received after the control signal. Thus, the receiver decrypts frames received after receiving 830 the control signal.

After receiving 830 the control signal, the receiver receives 835 a frame from the transmitter. The frame includes data and error detection information, as further described above in conjunction with FIGS. 3, 4, and 7. The receiver decrypts 840 the received frame using the encrypted counter block that was generated from the output of the counter of the receiver. As further described above, in various embodiments the receiver decrypts 840 the received frame by performing an XOR operation on the received frame and an encrypted counter block that an encryption block generates from the output of the counter of the receiver. The result of the XOR operation is the decrypted frame from the transmitter including error detection information.

In various embodiments, a communication link between the transmitter and the receiver includes multiple lanes, with frames being transmitted on different lanes. So the transmitter transmits encrypted modified frames using a plurality of lanes of the communication link in some embodiments. The receiver receives encrypted modified frames from the plurality of lanes and decrypts the encrypted modified frames, as further described above in conjunction with FIGS. 5, 6, and 8. In various embodiments, the transmitter modifies a number of lanes used to transmit frames to the receiver. For example, the transmitter transmits frames subsequent to a particular frame using a set of lanes that is less than the plurality of frames. This reduction in a number of lanes used for transmission may conserve power used for transmission or remove lanes from use in transmission when errors or performance issues occur on one or more of the lanes. Such a reduction in lanes used for transmitting data may occur without resynchronization of the counter of the transmitter and the counter of the receiver, as the synchronization of the counter of the transmitter and the counter of the receiver, further described above in conjunction with FIGS. 2-8 is performed for different lanes of the communication link, which allows synchronization of counters of the transmitter and of the receiver for individual lanes. This allows the number of lanes used to transmit data by the transmitter to be dynamically modified (e.g., reduced) without renegotiating synchronization of the counter of the transmitter and the counter of the receiver.

Encrypting a frame of data when the frame is being scrambled prior to transmission over a communication link allows the data to be protected during transmission. To provide additional protection, error detection information is appended to the frame prior to transmission, so the frame includes the error detection information when encrypted. Inclusion of the error detection information when encrypting the frame allows a receiver to detect errors caused by modification of the data during transmission. To simplify encryption, a transmitter leverages a counter used to scramble a frame prior to transmission to encrypt the frame. The output of the counter is provided to an encryption module that outputs encryption data for encrypting the frame. A receiver similarly provides output of a counter used for descrambling a frame to an encryption module that outputs encryption data used to decrypt a frame. A training mode during which unencrypted training frames are transmitted between the transmitter and the receiver, with the receiver using known values of training frames to determine an initial value for the counter of the receiver. The initial value infers the value of the counter of the transmitter used for encryption, allowing the counter of the transmitter and the counter of the receiver to be synchronized without having to specifically negotiate a starting value for both the counter of the transmitter and the counter of the receiver. Additionally, using the output of the counter of the transmitter and the counter of the receiver to encrypt and to decrypt a frame allows encryption and decryption to be performed without increasing latency of data transmission between the transmitter and the receiver.

Exemplary embodiments of the present invention are described largely in the context of a fully functional computer system for performing a context switch by replacing an address translation context used by the computer processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for encrypting frames, the method comprising:
    scrambling each training frame of a set from a transmitter to a receiver, each training frame of a set scrambled based on an output of a counter of the transmitter and a training frame, where each scrambled training frame is unencrypted;
    transmitting a control signal from the transmitter to the receiver, including transmitting the control signal on each of a plurality of lanes that comprise a connection between the transmitter and the receiver;
    modifying a frame to include error detection information;
    after transmitting the control signal to the receiver, encrypting the modified frame including the error detection information using an encrypted counter block that is generated from the output of the counter; and
    transmitting the encrypted modified frame from the transmitter to the receiver.

2. The method of claim 1, wherein the counter is continuously incremented.

3. The method of claim 1, wherein scrambling each training frame of the set based on the output of the counter and the training frame comprises:
    performing an exclusive OR operation on the training frame and the output of the counter.

4. The method of claim 1, wherein encrypting the modified frame including the error detection information using the encrypted counter block that is generated from the output of the counter comprises:
    combining the output of the counter with a starting value;
    generating the encrypted counter block from a key and the combination of the output of the counter with the starting value; and
    combining the encrypted counter block with the modified frame including the error detection information to generate the encrypted modified frame.

5. The method of claim 4, wherein combining the encrypted counter block with the modified frame including the error detection information to generate the encrypted modified frame comprises:
    performing an exclusive OR operation on the encrypted counter block and the modified frame including the error detection information.

6. The method of claim 1, wherein the counter comprises a linear feedback shift register.

7. The method of claim 1, wherein transmitting the encrypted modified frame from the transmitter to the receiver comprises:
    transmitting the encrypted modified frame from the transmitter to the receiver using a plurality of lanes that comprise a connection between the transmitter and the receiver; and
    transmitting a subsequent encrypted modified frame from the transmitter to the receiver using a set of lanes that is less than the plurality of lanes.

8. A method for decrypting frames comprising:
    receiving an initial training frame at a receiver from a transmitter, where the initial training frame is unencrypted;
    determining an initial value for a counter based on a difference between the initial training frame and an expected value for the initial training frame;
    setting the counter to the initial value;
    receiving a set of training frames while the counter is continuously incremented from the initial value, where each training frame is unencrypted;
    descrambling each of the set of training frames using an output of the counter;
    receiving a control signal from the transmitter indicating subsequent transmission of encrypted frames including error detection information, including receiving the control signal on each of a plurality of lanes that comprise a connection between the transmitter and the receiver;
    receiving a frame including error detection information after receiving the control signal; and
    decrypting the frame including error detection information using an encrypted counter block that is generated from the output of the counter.

9. The method of claim 8, wherein determining the initial value for the counter based on the difference between the initial training frame and the expected value for the initial training frame comprises:
    performing an exclusive OR operation on the initial training frame and the expected value for the initial training frame.

10. The method of claim 8, wherein receiving the control signal from the transmitter indicating subsequent transmission of encrypted frames including error detection information further comprise:
    determining the control signal was received in response to the receiver determining the control signal was received from at least a threshold number of the plurality of lanes.

11. The method of claim 10, wherein the threshold number of the plurality of lanes comprises a majority of the plurality of lanes.

12. The method of claim 8, wherein decrypting the frame including error detection information using the encrypted counter block that is generated from the output of the counter comprises:
   combining the output of the counter with a starting value;
   generating the encrypted counter block from a key and the combination of the output of the counter with the starting value; and
   combining the encrypted counter block with the frame including error detection information generate a decrypted frame including error detection information.

13. The method of claim 12, wherein combining the encrypted counter block with the frame including error detection information generate a decrypted frame including error detection information comprises:
   performing an exclusive OR operation on the encrypted counter block and the frame including error detection information.

14. The method of claim 8, wherein receiving the frame including error detection information after receiving the control signal comprises:
   receiving the frame including error detection information using a plurality of lanes that comprise a connection between the transmitter and the receiver; and
   receiving a subsequent frame from the receiver using a set of lanes that is less than the plurality of lanes.

15. An apparatus for decrypting data comprising a computer processor, a computer memory operatively coupled to the computer processor, the computer memory having disposed within it computer program instructions that, when executed by the computer processor, cause the apparatus to carry out steps of:
   receiving an initial training frame at a receiver from a transmitter, where the initial training frame is unencrypted;
   determining an initial value for a counter of the receiver based on a difference between the initial training frame and an expected value for the initial training frame;
   setting the counter to the initial value;
   receiving a set of training frames while the counter of the receiver is continuously incremented from the initial value, where each training frame is unencrypted;
   descrambling each of the set of training frames using an output of the counter of the receiver;
   receiving a control signal from the transmitter indicating subsequent transmission of encrypted frames including error detection information, including receiving the control signal on each of a plurality of lanes that comprise a connection between the transmitter and the receiver;
   receiving a frame including error detection information after receiving the control signal; and
   decrypting the frame including error detection information using an encrypted counter block that is generated from the output of the counter of the receiver.

16. The apparatus of claim 15, wherein decrypting the frame including error detection information using the encrypted counter block that is generated from the output of the counter of the receiver comprises:
   combining the output of the counter with a starting value;
   generating the encrypted counter block from a key and the combination of the output of the counter of the receiver with the starting value; and
   combining the encrypted counter block with the frame including error detection information generate a decrypted frame including error detection information.

17. The apparatus of claim 15, wherein the frame including error detection information comprises a frame encrypted by the transmitter based on a value determined from an output of a counter of the transmitter.

18. The apparatus of claim 16, wherein the value determined from an output of the counter of the transmitter comprises an encrypted counter block generated from the output of the counter of the transmitter.

* * * * *